(12) United States Patent
Sathianathan

(10) Patent No.: US 8,345,746 B2
(45) Date of Patent: Jan. 1, 2013

(54) VIDEO QUANTIZER UNIT AND METHOD THEREOF

(75) Inventor: Brainerd Sathianathan, San Jose, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 1127 days.

(21) Appl. No.: 12/235,129

(22) Filed: Sep. 22, 2008

(65) Prior Publication Data

US 2010/0074327 A1 Mar. 25, 2010

(51) Int. Cl.
 *H04N 7/50* (2006.01)
(52) U.S. Cl. .............. 375/240.03; 375/E7.245
(58) Field of Classification Search .......... 375/240, 375/242, 240.2, 240.02, 240.05, 240.18, 375/E7.176, E7.177, E7.198, 240.03, 245, 375/240.22, E7.034, E7.048, E7.139, E7.245
See application file for complete search history.

(56) References Cited

U.S. PATENT DOCUMENTS

| 7,505,480 B1 * | 3/2009 | Zhang et al. | 370/465 |
| 2005/0025053 A1 | 2/2005 | Izzat | |
| 2006/0018378 A1 | 1/2006 | Piccinelli | |
| 2008/0219356 A1 * | 9/2008 | Johar et al. | 375/240.24 |

FOREIGN PATENT DOCUMENTS

| EP | 1 580 914 | 9/2005 |
| KR | 10-2007-0081949 | 8/2007 |
| KR | 10-2008-0055820 | 6/2008 |

OTHER PUBLICATIONS

Muntean, et al "Adaptive Pre-Recorded Multimedia Streaming", GLOBECOM'02. 2002-IEEE Global Telecommunications Conference Proceedings, Taipei, Taiwan, Nov. 17-21, 2002; New York, NY: IEEE, US, vol. 2, Nov. 17, 2002, pp. 1728-1732.

Liu, et al "Joint Temporal-Spatial Rate Control for Adaptive Video Transcoding", Proceedings of the 2003 International Conference on Multimedia and Expo: Jul. 6-9, 2003, Baltimore Marriott Waterfront Hotel, Baltimore, Maryland, USA, IEEE Operations Center, US, vol. 2, Jul. 6, 2003, pp. 225-228.

* cited by examiner

*Primary Examiner* — Gilberto Barron, Jr.
*Assistant Examiner* — Izunna Okeke
(74) *Attorney, Agent, or Firm* — Farjami & Farjami LLP

(57) ABSTRACT

A quantizer and method are disclosed.

8 Claims, 2 Drawing Sheets

VIDEO QUANTIZER UNIT AND METHOD THEREOF

FIELD

The unit and method relate generally to the quantization of digital data.

BACKGROUND

Systems and methods that quantize digital data, such as video data, are well known. For example, most video, still image and audio compression schemes use some form of quantization to reduce the bandwidth of the compressed data. Most of these known quantization systems are too slow for some applications and/or are too computationally expensive. Thus, it is desirable to provide a quantizer and method that overcomes the problems with the current techniques and it is to this end that the apparatus and method are directed.

DETAILED DESCRIPTION OF ONE OR MORE EMBODIMENTS

The apparatus and method are particularly applicable to the quantization of video data streams and it is in this context that the apparatus and method will be described. It will be appreciated, however, that the apparatus and method has greater utility as it may be used to quantize other types of digital data and is not limited to video data which is the example of the application of the technology set forth below.

Figure 1:
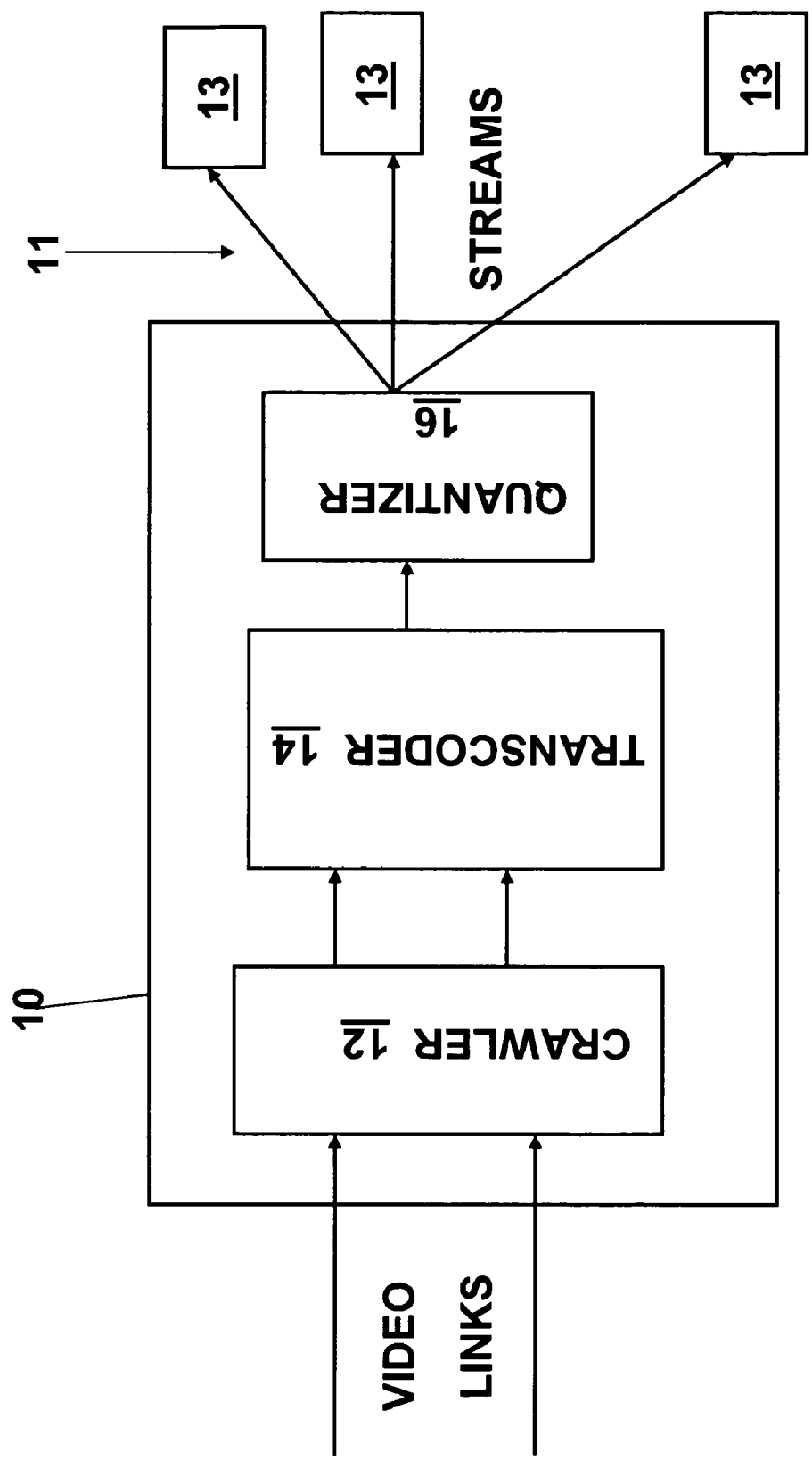
FIG. 1 illustrates a video steaming apparatus that may include a quantizer.

FIG. 1 illustrates a video steaming apparatus 10 that may include a quantizer that may be used to stream, in one implementation, video data from an originator, such as a server computer, over a link 11, such as the Internet, to one or more target devices 13 that each have a media player to play the streaming videos. Each target device may be a cellular phone, a mobile device with wireless telephone capabilities, a smart phone (such as the Blackberry products or the Apple iPhone) and the like which have a wireless capability and the capability to display/play a streaming video. The apparatus 10, in one implementation, is one or more server computers executing a plurality of lines of computer code to implement the operations described below for the apparatus 10. The apparatus 10 may also be implemented in hardware which may include one or more programmable logic devices, a processing unit executing a program and the like. In one implementation, the appliance 10 may be two Intel E5420 Quad Core processors, 4 2 Gb DDR2 DIMMs, two 1 TB RAID drives with 32 MB cache, an Ubuntu 6.1 operating system and Dual Gigabyte Ethernet NICs.

The apparatus 10 transcodes and stream video files over a mobile link whose bandwidth and quality changes often using adjustable video quantization to provide a variable bit rate streaming apparatus and method without the enormous storage requirements of the typical systems. As shown in FIG. 1, the apparatus 10 may receive video links (for example, uniform resource locators) that are links to web-sites with source video data that is going to be transcoded and streamed using the apparatus. The source video data may be in different formats such as in an MPEG format, an flash video format (.flv), a 3 gp format, an mp4 format, an h.263 format or an h.264 format, etc. which need to be transcoded so that it can be streamed by the apparatus. In the apparatus 10, a crawler 12 may resolve the video links and then download the source video data to the apparatus 10. The source video data is then passed onto a transcoder 14 that performs transcoding of the source video data to generate a transcoded video wherein all of the transcoded videos have the same form. During the transcoding, the source video data in the different formats may also require form conversion, resolution conversion, bit rate adjustment and/or frame rate adjustment.

Once the video had been transcoded into a transcoded video, it is passed onto a quantizer 16 that performs quantization on the transcoded video to generate a quanitized video (having a particular bit rate and quantization appropriate for the link over which the video will be streamed) which can then be streamed over the mobile link to one or more mobile devices.

Figure 2:
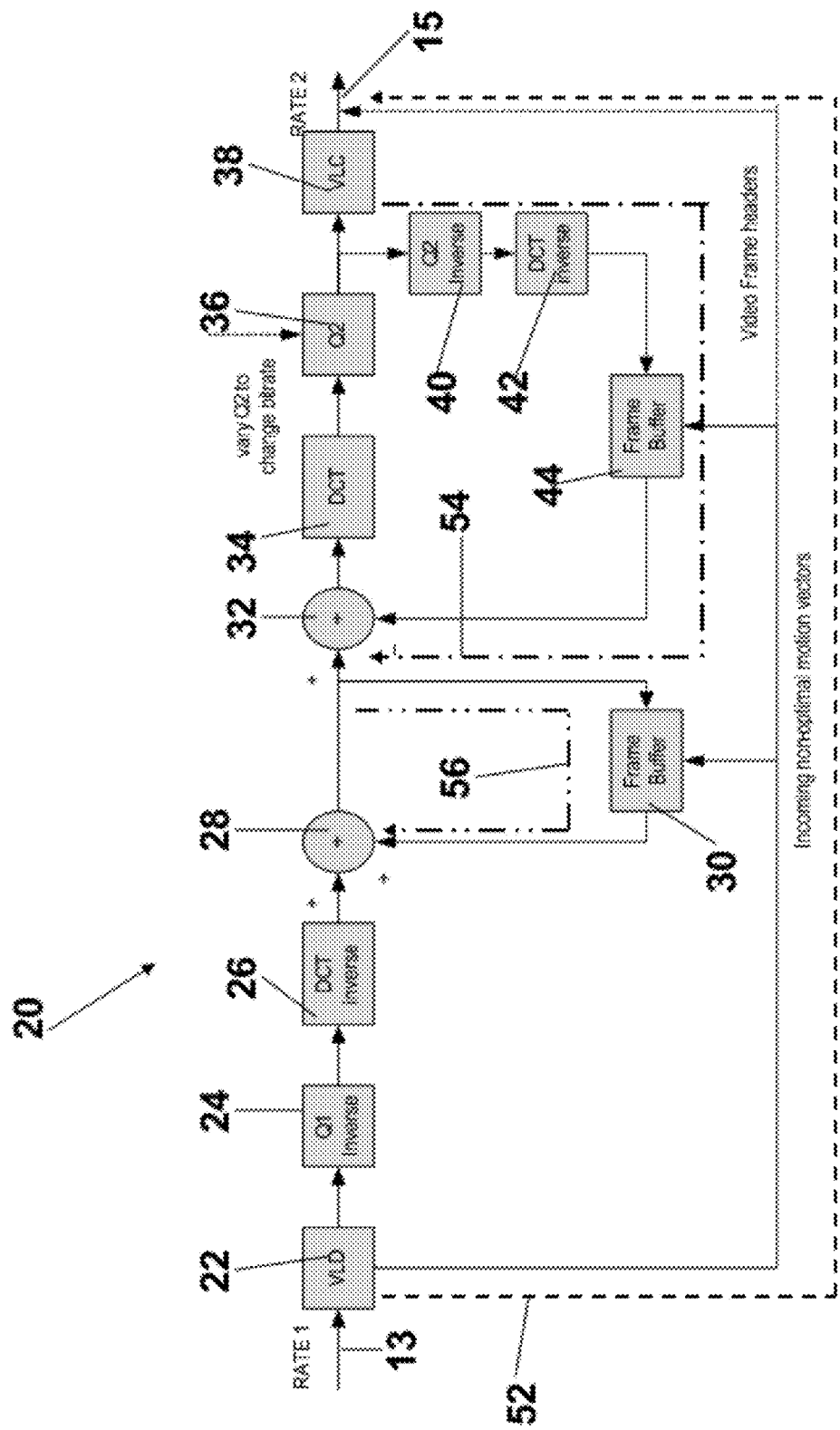
FIG. 2 illustrates an example of an embodiment of a quantizer.

FIG. 2 illustrates an example of an embodiment of a quantizer 20. In traditional implementations quantizes are simplified cascaded transcoders with a decoding and then an encoding unit. Traditional quantizers' will have 4 inverse IDCT functions and 4 motion estimation/compensation functions. The proposed quantizer will only have 2 inverse DCT function and completely eliminate the motion estimation functions. The quantizer 20 may avoid motion estimation during the quantization which increases the speed of the quantizer. The quantizer 20 also avoids the discrete cosine transform (DCT) domain (or any other transform domain if another type of transform is being used in the compression) as much as possible since the process of working in the DCT domain is more computationally expensive.

The quantizer may receive an input video 13 that has been compressed at a first quantization level Q1 (and thus have a first bit rate) and may output an output signal 15 that has been compressed at a second quantization level Q2 (and thus have a second bit rate). The quantizer may include a variable length decode (VLD) unit 22 that decodes the variable length decoding of the incoming compressed video bitstream to generate a stream of quantized DCT coefficients, an inverse quantizer unit 24 that removes the quantization and results in a stream of unquantized DCT coefficients. The current qunatizer's technique is applicable for most block-based and transform based video compression standards. This quantizer architecture can be extended to many other transforms including wavelets. The quantizer may also include an inverse discrete cosine transform unit 26 that performs reverse DCT on the stream of coefficients and generates a stream of raw video data which means that the video data is in the pixel domain. The resultant stream of raw video data (which represents a frame of video pixel data) is then summed/compared by a summer unit 28 to a prior frame of pixel data (to perform motion compensation in the pixel domain) that is stored in a frame buffer 30 and the resultant video pixel data is fed into a second summer unit 32 which combines the resultant video pixel data with a motion compensated frame of pixel data (at the second quantization level) that is stored in a second frame buffer 44 (to again perform motion compensation in the pixel domain) to generate video pixel data that has been motion compensated for the previous frame at the old quantization level as well as the frame at the new quantization level. The resultant pixel data is then fed into a discrete cosine transform unit 34 that generate a new set of DCT coefficients based on the motion compensated video data frames. The new set of DCT coefficients are then quantized by a quantizer unit 36 at a second, different quantization level to generate quantized DCT coefficients that may be variable length coded using a variable length coder unit 38) and output as a compressed output signal at the second quantization level (and thus at the second bit rate.)

The quantizer 20 may implement, using a number of components, a first quantizer loop 52, a second quantizer loop 54 and a third quantizer loop 56 as shown by the dotted lines in FIG. 2. The first quantizer loop 52 may include the VLD and VLC units 22, 38 and operate to communicate the motion vector information in the first compressed bit stream 14 R1 from the VLD unit 22 to the VLC unit 28 so that, without recalculating the motion vector (used for inter-frame motion compensation) during the transcoding, the motion vector can be inserted back into the second compressed bit stream 15 before it is variable length coded.

The second quantizer loop 54 may perform motion compensation between each frame of data on the encode side wherein the quantized coefficients output from quantizer 36 may be inverse quantized using an inverse quantizer unit 40 to generate coefficients, inverse discrete cosine transformed using an inverse discrete cosine transform unit 42 to generate frame pixel data at the new quantization level that is stored in the second frame buffer 44. The frame pixel data at the new quantization level is then compared to/summed with the pixel data from the inverse DCT unit 26.

The third quantizer loop 56 may enhance motion compensation of the decoder side by summing/comparing the video pixel data from the current frame to the video pixel data from the prior frame that is stored in the first frame buffer 30.

In the quantizer shown in FIG. 2, the motion compensation occurs in the pixel domain which is computationally more efficient that performing the motion compensation in the DCT domain. In addition, the three quantizer loops described above avoids motion estimation. Using the quantizer, an I frame (which does not contain any motion compensation) is simply decompressed and then recompressed using the new quantization level. A P frame (which has a motion vector associated with it) has its motion vector sent through the outer loop of the quantizer to avoid motion estimation.

The above quantizer is also capable of adjusting region of interest on any given video frame, the essential idea behind this is that in a given video frame there will be two different quantization values will be used. The region that will have a lower quantization(higher quality) is determined by the motion vector information on the frame header. As a result elements that have higher movements in the picture will be lot clearer than the static elements. The region of interest is configurable, by default a 4×4 macro-block region is considered as the region of interest. The two different quantization levels are determined by configuration options provided to the qunatizer (for example: region of interest quantization factor is 6 and the other region is kept at 8).

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A quantization system comprising:
   a receiver configured to receive a first compressed bit stream having a first quantization level and a first motion vector, wherein the first motion vector is extracted from the first compressed bit stream;
   an inverse quantizer configured to perform an inverse quantization of the first compressed bit stream at the first quantization level to generate a first set of coefficients;
   an inverse transformer configured to apply an inverse transform to the first set of coefficients to generate a frame of pixel data;
   a motion compensator configured to apply motion compensation using the frame of pixel data to generate motion compensated pixel data using a prior frame of pixel data stored in a frame buffer receiving the first motion vector extracted from the first compressed bit stream;
   a transformer configured to generate a second set of coefficients based on the motion compensated pixel data; and
   a quantizer configured to quantize the second set of coefficients from the motion compensated pixel data at a second quantization level to generate a second compressed bit stream having the second quantization level, wherein the first motion vector is inserted back into the second compressed bit stream without calculations performed on the first motion vector.

2. The quantization system of claim 1 further comprising a variable length decoder configured to decode a variable length code first compressed bit stream to generate the first set of quantized coefficients that are input to the inverse quantizer.

3. The quantization system of claim 1 further comprising a variable length coder configured to encode variable length coding of the second compressed bit stream.

4. The quantization system of claim 1, wherein the first and second sets of coefficients further comprise discrete cosine coefficients.

5. A method comprising:
   receiving a first compressed bit stream having a first quantization level and a first motion vector;
   extracting the first motion vector from the first compressed bit stream;
   applying an inverse quantization, using an inverse quantizer, to the first compressed bit stream at the first quantization level to generate a first set of coefficients;
   applying an inverse transformation, using an inverse transformer, to the first set of coefficients to generate a frame of pixel data;
   performing a motion compensation using the frame of pixel data to generate motion compensated pixel data using a prior frame of pixel data stored in a frame buffer receiving the first motion vector extracted from the first compressed bit stream;
   applying a transformation to generate a second set of coefficients based on the motion compensated pixel data; and
   quantizing the second set of coefficients from the motion compensated pixel data at a second quantization level to generate a second compressed bit stream having the second quantization level, wherein the first motion vector is inserted back into the second compressed bit stream without calculations performed on the first motion vector.

6. The method of claim 5 further comprising decoding a variable length code to generate the first set of quantized.

7. The method of claim 5 further comprising variable length coding of the second set of coefficients at the second quantization level to generate the second compressed bit stream.

8. The method of claim 5, wherein the first and second sets of coefficients further comprise discrete cosine coefficients.

* * * * *